(12) United States Patent
Niles et al.

(10) Patent No.: US 10,950,370 B2
(45) Date of Patent: Mar. 16, 2021

(54) CONDUCTOR COVER APPLICATOR

(71) Applicant: Cantega Technologies Inc., Edmonton (CA)

(72) Inventors: Martin S. Niles, Stony Plain (CA); Edmond LeRouzic, Edmonton (CA); Paul Alfaro, Anaheim, CA (US)

(73) Assignee: CANTEGA TECHNOLOGIES INC., Edmonton (CA)

( * ) Notice: Subject to any disclaimer, the term of this patent is extended or adjusted under 35 U.S.C. 154(b) by 316 days.

(21) Appl. No.: 15/887,836

(22) Filed: Feb. 2, 2018

(65) Prior Publication Data

US 2018/0233256 A1    Aug. 16, 2018

Related U.S. Application Data

(60) Provisional application No. 62/457,810, filed on Feb. 10, 2017.

(51) Int. Cl.
| | | |
|---|---|---|
| *H01B 13/06* | (2006.01) | |
| *H02G 1/00* | (2006.01) | |
| *H02G 1/02* | (2006.01) | |
| *H01B 7/17* | (2006.01) | |
| *H02G 3/04* | (2006.01) | |
| *H01B 17/58* | (2006.01) | |

(52) U.S. Cl.
CPC ............ *H01B 13/062* (2013.01); *H01B 7/17* (2013.01); *H01B 13/06* (2013.01); *H02G 1/00* (2013.01); *H02G 1/02* (2013.01); *H01B 17/58* (2013.01); *H02G 3/0481* (2013.01); *Y10T 29/53657* (2015.01)

(58) Field of Classification Search
CPC .... H01B 9/17; H01B 213/06; H01B 213/062; H01B 213/18; H01B 213/22; H01B 213/344; H01B 17/58; H02G 1/00; H02G 1/02; H02G 1/085; H02G 1/16; H02G 3/0481; Y10T 29/53275; Y10T 29/53657
See application file for complete search history.

(56) References Cited

U.S. PATENT DOCUMENTS

| | | |
|---|---|---|
| 1,485,994 A | 3/1924 | Salisbury |
| 3,017,905 A | 1/1962 | Klein |
| 3,133,984 A | 5/1964 | Berwick et al. |
| 3,600,784 A | 8/1971 | Propst et al. |
| 3,712,261 A | 1/1973 | McLelland et al. |
| 3,900,698 A | 8/1975 | Sanji |
| 5,183,237 A * | 2/1993 | Drago ................. G02B 6/4464 254/134.4 |

(Continued)

OTHER PUBLICATIONS

Salisbury Insulation Covers—STINGER Covers, catalog, published as early as Nov. 21, 2008, 2 pages.

(Continued)

*Primary Examiner* — Peter Dungba Vo
*Assistant Examiner* — Joshua D Anderson
(74) *Attorney, Agent, or Firm* — Ohlandt, Greeley, Ruggiero & Perle, L.L.P.

(57) ABSTRACT

Conductor cover applicators may define a mouth, or may incorporate movable jaws that open and close a mouth, for receiving a cable. The applicators may have a separator for spreading open a conductor cover, so that the cover can be fed through the applicator onto the cable. Methods of use and other variations are disclosed.

26 Claims, 7 Drawing Sheets

(56) References Cited

U.S. PATENT DOCUMENTS

| | | | |
|---|---|---|---|
| 5,796,032 A | 8/1998 | Hadley | |
| 6,195,861 B1 | 3/2001 | Frye et al. | |
| 6,227,251 B1 | 3/2001 | Ahn et al. | |
| 6,730,852 B1 | 5/2004 | Puigcerver et al. | |
| 6,809,266 B1* | 10/2004 | Hoi | H02G 1/085 174/135 |
| 8,621,735 B2 | 1/2014 | Niles et al. | |
| 9,102,043 B2 | 8/2015 | Morin et al. | |
| 10,263,402 B2 | 4/2019 | Niles et al. | |
| 2005/0245141 A1* | 11/2005 | Ifort | H02G 3/0462 439/761 |
| 2009/0241324 A1* | 10/2009 | Jang | H02G 1/085 29/728 |
| 2011/0083783 A1 | 4/2011 | Niles et al. | |

OTHER PUBLICATIONS

Salisbury Outage Protection, brochure, published at least as early as Nov. 21, 2008, 32 pages.

Salisbury product catalog, published at least as early as Nov. 21, 2008, 142 pages.

PCT international search report for International application No. PCT/CA2010/001590, dated Feb. 8, 2011, 7 pages.

Hubbell Power Systems Grip-All Clampsticks, catalog, Aug. 2009, 1 page.

Salisbury Universal Hotstick Applicator and Instant Insulation, URL=http://www.salisburybyhoneywell.com/en-US/Pages/Product.aspx?category=Instant%20Insulation&cat=HLS-HES&pid=Instant_insulation_applicator, accessed on Dec. 4, 2012, 1 page.

Distribution Industrielle GC, Spring clamp with hot stick installation eyes for isolating blanket, URL=https://www.distgc.com/product.php?ProductID=2082&UILanguage=EN, believed to be available at least before Jan. 20, 2014, 2 pages.

Downloaded from www.techflex.com; Using the F6 Tool; Jan. 25, 2017; p. 1-2.

Downloaded from www.hellermanntyton.com: Helawrap Cable Cover HWPP1612; Helawrap HWPP, Article No. 161-64204; Jan. 2017; p. 1-3.

Downloaded from www.painlessperformance.com: Powerbraid Tool Assistance Kit; Jan. 2017; p. 1-2.

Downloaded from www.aliexpress.com: 22mm*5m Spiral Cable Wire Wrap Tube Computer Manage Cord Cable Sleeves Sprial Flexibe PE Cable Sleeve; Nov. 28, 2017; p. 1-5.

\* cited by examiner

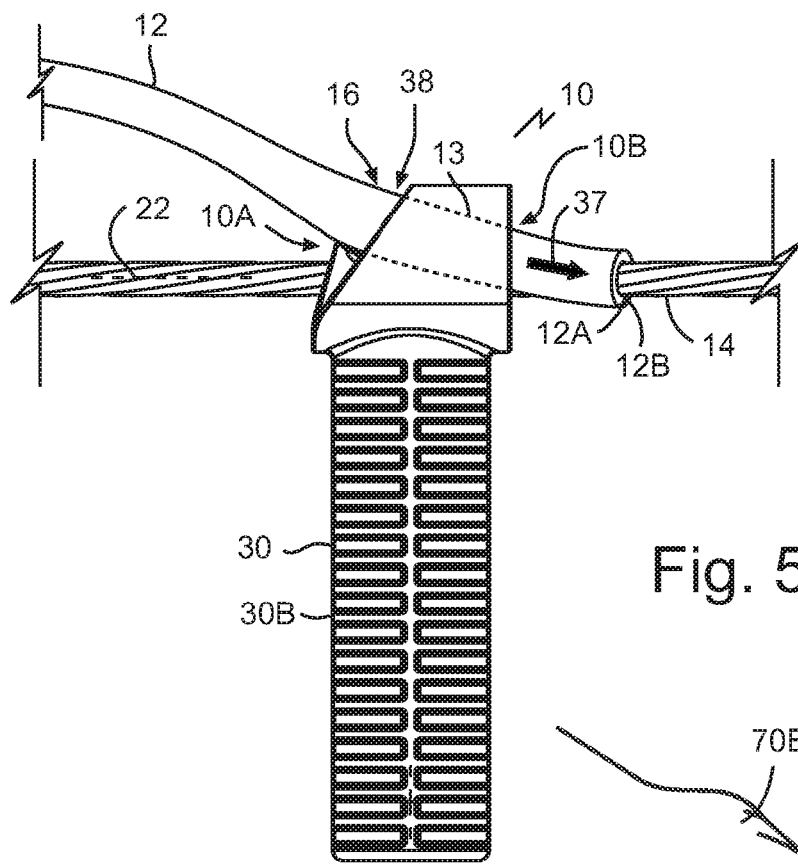
Fig. 5
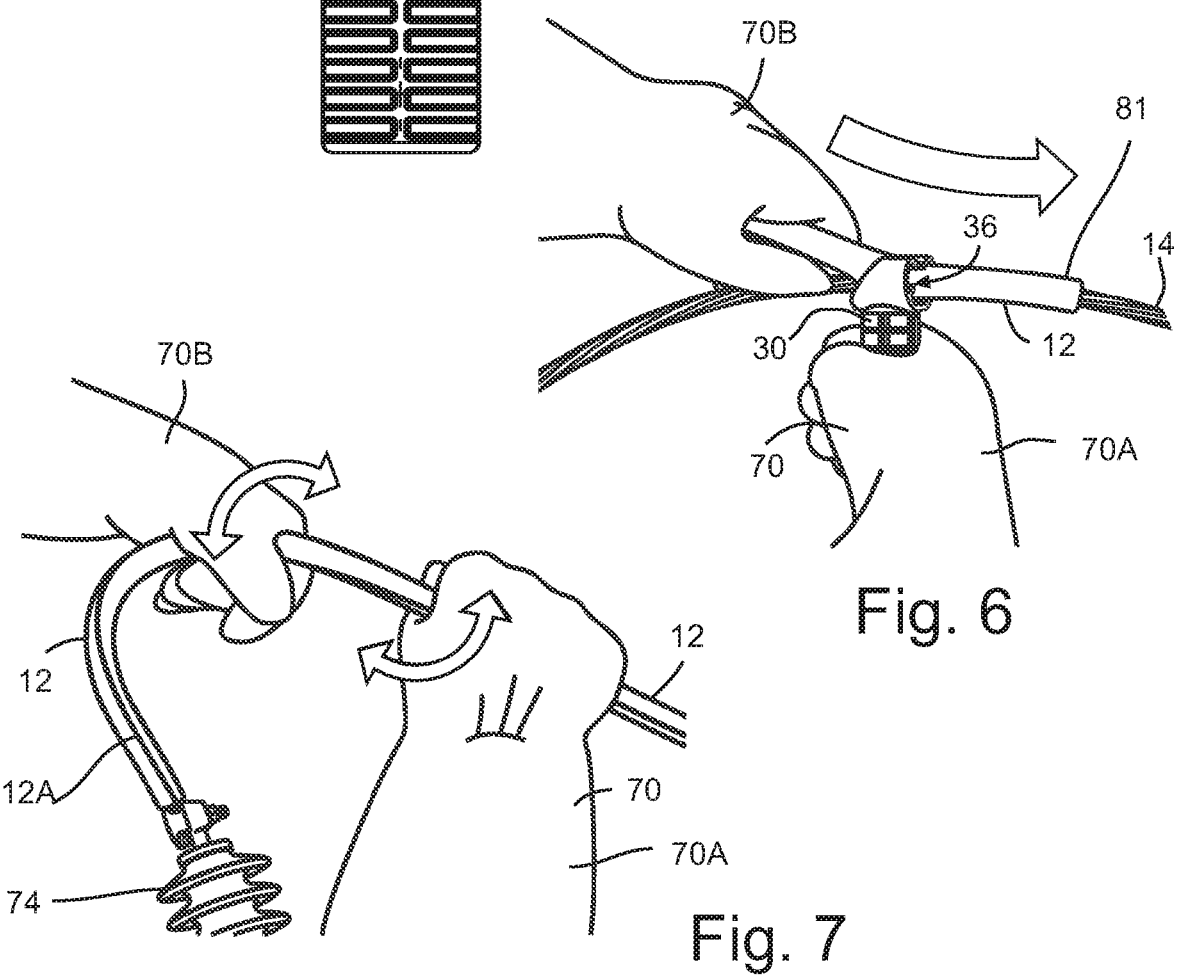
Fig. 6
Fig. 7

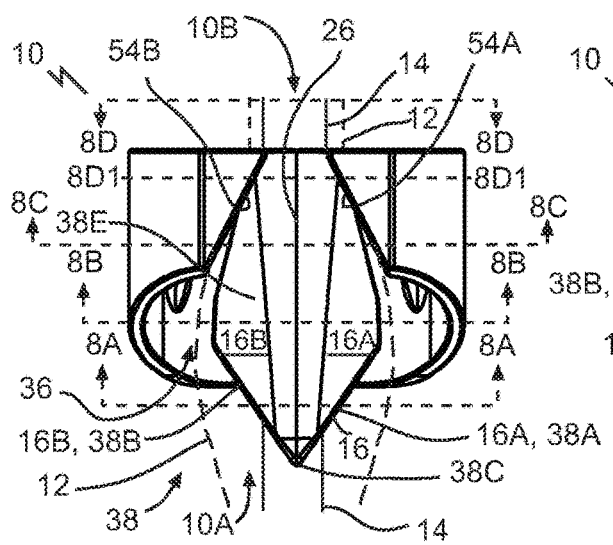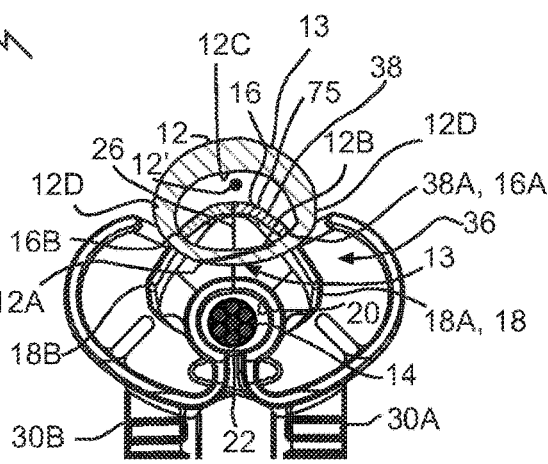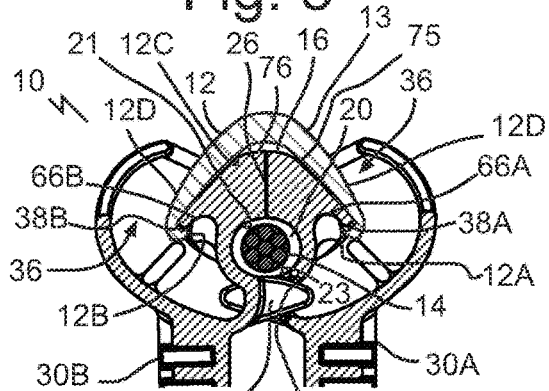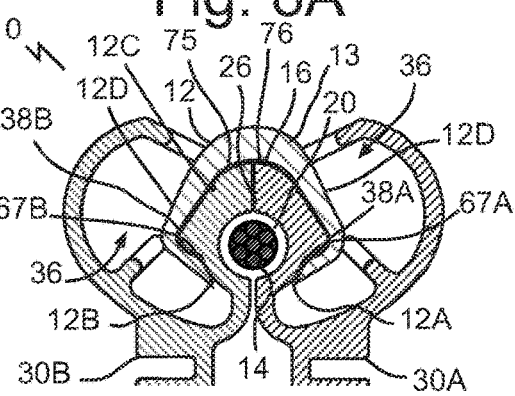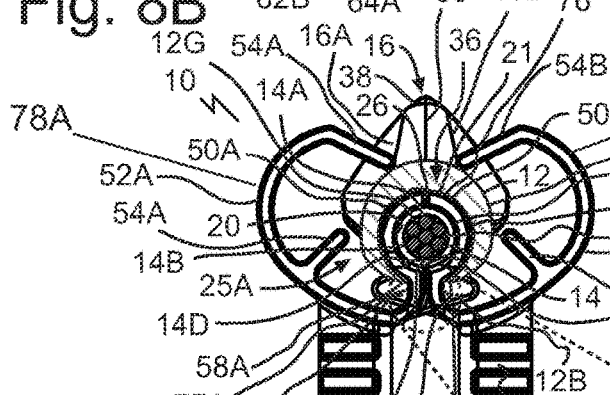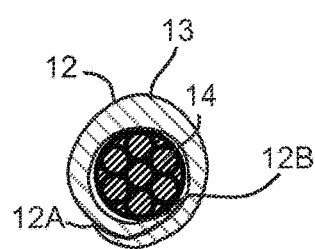

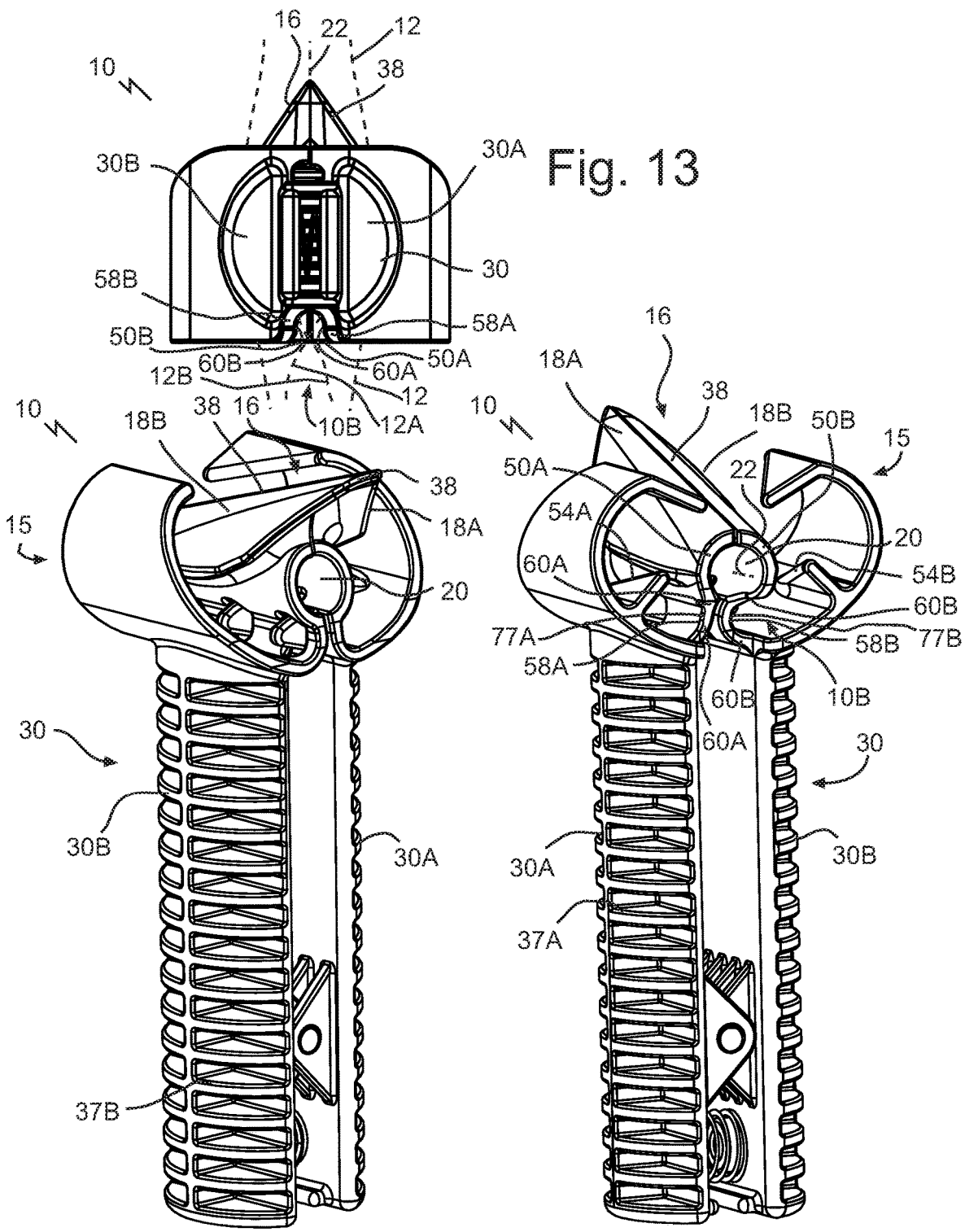

CONDUCTOR COVER APPLICATOR

TECHNICAL FIELD

This document relates to the field of conductor cover applicators and methods of applying conductor cover.

BACKGROUND

Conductor cover may be installed over cables in order to protect energized cables from wildlife and other incidental contact that may cause power system faults or outages. Conductor covers such as Instant Insulation or Stinger Covers sold by Salisbury are examples of the type of cover used in the industry for this purpose. One type of applicator used in the industry for applying such cover on energized conductor is the 2494 applicator, also sold by Salisbury. Another type of applicator is disclosed in U.S. Pat. No. 8,621,735.

SUMMARY

An applicator is disclosed for applying a dielectric conductor cover to a cable, the dielectric conductor cover being tubular and split longitudinally to define a first longitudinal edge and a second longitudinal edge, the applicator comprising: a separator having jaws and defining a passage for a cable to, in operation, move axially through the separator along a cable travel axis defined by the passage; the jaws being shaped to contact, in operation of the applicator, an interior surface of the dielectric conductor cover to spread open the first longitudinal edge and the second longitudinal edge along a portion of the dielectric conductor cover to allow the portion of the dielectric conductor cover to be applied to a cable positioned in operation within the passage; the jaws being structured to vary a separation distance between the jaws to open and close a mouth, defined between the jaws, through which the cable is permitted to move in a radial direction relative to the cable travel axis to enter the passage.

A method is disclosed of applying a dielectric conductor cover to a cable, the dielectric conductor cover being tubular and split longitudinally to define a first longitudinal edge and a second longitudinal edge, the method comprising: moving a cable in a radial direction through a mouth defined by jaws of a separator into a passage defined by the separator; closing the jaws about the cable; spreading open the first longitudinal edge and the second longitudinal edge of a portion of the dielectric conductor cover with the separator, the separator contacting an interior surface of the dielectric conductor cover; and applying a length of the dielectric conductor cover to the cable through the separator.

An applicator is disclosed for applying a dielectric conductor cover to a cable, the dielectric conductor cover being tubular and split longitudinally to define a first longitudinal edge and a second longitudinal edge, the applicator comprising: a separator that defines a passage for a cable to, in operation, move axially through the separator along a cable travel axis defined by the passage; the separator having a pair of separating elements arranged at respective angular positions about the passage relative to the cable travel axis; the pair of separating elements, in at least one configuration, being spaced to define a mouth through which the cable is permitted to move in a radial direction relative to the cable travel axis to enter the passage; and the pair of separating elements being shaped to contact, in operation of the applicator, an interior surface of an arcuate portion of the dielectric conductor cover, the arcuate portion being defined perpendicular to a conductor cover axis, to spread open the first longitudinal edge and the second longitudinal edge along the arcuate portion, with the arcuate portion bridging the mouth, to allow the dielectric conductor cover to be applied to a cable positioned in operation within the passage.

A method is disclosed of using the applicator to apply a length of a dielectric conductor cover to a cable.

In various embodiments, there may be included any one or more of the following features: A handle mounted to the separator and connected to operate the jaws to vary the separation distance between the jaws. The handle is formed of handle parts that: are connected to move relative to one another; and are each connected to a respective jaw of the jaws such that relative movement between the handle parts acts to vary the separation distance between the jaws. The handle parts vary the separation distance upon between squeezed together. The handle forms a hand grip shaft that is split in a longitudinal direction to define the handle parts. An axis of the hand grip shaft is perpendicular to, or within forty-five degrees of perpendicular to, the cable travel axis of the passage. The handle parts are connected to pivot relative to one another. The handle parts are connected to pivot at a pivot axis located in between a first axial end and a second axial end of the handle. The handle is a pistol grip handle. The handle comprises a hand grip shaft that is extended from the separator at a non-zero angle relative to the cable travel axis. The jaws are connected to pivot relative to one another to vary the separation distance. The jaws open and close in a clamshell fashion to expand and contract the cross-sectional area of the passage. The jaws are biased to close the mouth. Each jaw of the jaws forms a respective separating element of a pair of separating elements. The pair of separating elements collectively define a U-channel contoured to fit the portion of the dielectric conductor cover, with the U-channel having a middle portion and two arm portions that extend from respective sides of the middle portion, with the middle portion bridging the mouth defined by the jaws. The pair of separating elements each form arcuate parts with conductor-cover-facing external surfaces and cable-facing-internal surfaces, with the arcuate parts being shaped such that the conductor-cover-facing external surfaces each wrap more than ninety degrees around the passage. When the mouth is closed, the pair of separating elements collectively form a sleeve that defines the passage. The pair of separating elements collectively form a tongue, that has opposed surfaces that face outward to contact the interior surface of the dielectric conductor cover in operation to spread open the first longitudinal edge and the second longitudinal edge; one of the opposed surfaces is defined by one of the pair of separating elements, and the other of the opposed surfaces is defined by the other of the pair of separating elements; and the opposed surfaces move together with decreasing distance toward a cover insertion end of the tongue. The opposed surfaces converge at a knife point defined at the cover insertion end of the tongue. The pair of separating elements each define a longitudinal edge-receiving concave part, and an outer conductor cover contacting guide surface cross-sectional profile of the separator gradually transitions from the longitudinal edge-receiving concave parts, with increasing distance from a cover entry end of the applicator, into a convex shape to reduce curling of a respective one of the first and second longitudinal edges as the dielectric conductor cover travels through the separator in operation. Each jaw has: an inner part whose outward-facing surfaces are located to contact the interior surface of the dielectric conductor cover in operation to spread open the first longitudinal edge and the second longitudinal edge; and an outer part, which is spaced from the inner part to define a dielectric conductor cover-receiving channel, and whose inward-facing surfaces are located to contact an exterior surface of the dielectric conductor cover to press the dielectric conductor cover against the inner part. The mouth defines a front side of a cross-sectional profile of the passage; and the jaws have cooperating male and female parts that align to define a rear side of the cross-sectional profile of the passage, opposite the front side, at least when the jaws are closed. The applicator is made entirely of dielectric material. In some cases parts of the applicator are not made of dielectric material, for example a spring that biases the jaws together. Conductor cover spread open upon the separator and with a cable positioned within the passage. After applying the length of the dielectric conductor cover to the cable, opening the jaws to release the cable.

A method of using the applicator to apply a length of a dielectric conductor cover to a cable.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIGS. 1-7 are a sequence of front elevation views (FIGS. 1-2), side elevation views (FIGS. 4-5), and perspective views (FIGS. 3 and 6-7) illustrating a method of applying a conductor cover to a cable in an electrical power transmission system using a conductor cover applicator.

FIG. 8 is a top plan view of the conductor cover applicator of FIG. 1 with a cable loaded in the passage of the applicator, and illustrating in dashed lines the position of a conductor cover loaded in the separator.

FIG. 8A is a section view taken along the 8A-8A section lines of FIG. 8.

FIG. 8B is a section view taken along the 8B-8B section lines of FIG. 8.

FIG. 8C is a section view taken along the 8C-8C section lines of FIG. 8.

FIG. 8D is a rear elevation view taken along the 8D-8D view lines of FIG. 8, and illustrating a cross-section of the conductor cover taken along the 8D1-8D1 section lines of FIG. 8.

FIG. 8E is a close up view of the segment shown in dashed lines in FIG. 8D, and illustrating in dashed lines the curling of the longitudinal edges of the conductor cover upon exit from the applicator.

FIG. 8F is a section view of a cable with a conductor cover applied to it.

FIG. 13 is a bottom plan view of the conductor cover applicator of FIG. 1.

FIG. 14 is a front perspective view of the conductor cover applicator of FIG. 1.

FIG. 15 is a rear perspective view of the conductor cover applicator of FIG. 1.

DETAILED DESCRIPTION

Figure 1:
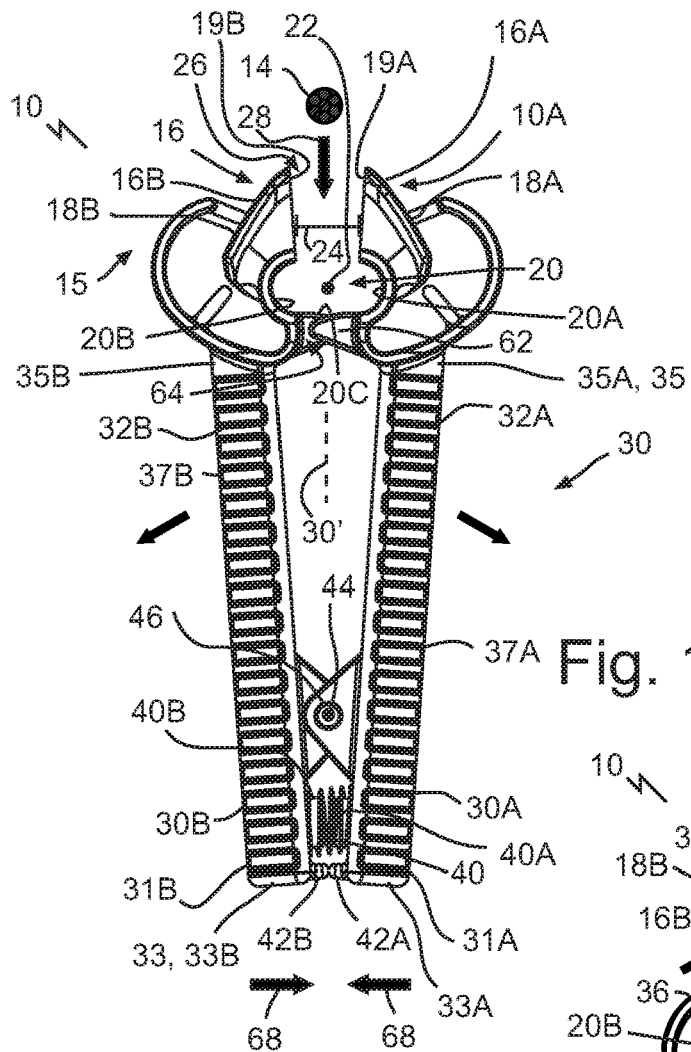

Immaterial modifications may be made to the embodiments described here without departing from what is covered by the claims.

Long-distance electricity transmission is typically carried with high voltage conductors. Transmission at higher voltages reduces resistance power loss, therefore line voltage for long distance lines is stepped up after generation by passing it through transformer stations prior to feeding the power to long-distance transmission lines. Transmission lines traverse large regions and require numerous support towers. The conductors in high tension powerlines are typically uninsulated because of the cost and additional weight of insulated versus uninsulated conductors. Because clearances between adjacent energized elements, and energized and grounded elements, are generally large in transmission systems, these systems generally are not at risk for animal-caused faults or outages.

Substations transform power from transmission voltages to distribution voltages, typically ranging from 2400 volts to 37,500 volts. Distribution voltages allow for reduced system clearances. These reduced clearances between phase to ground and phase to phase, increase system susceptibility to bird or animal caused outages. Electric poles, towers, and other electrical equipment including substations may provide attractive roosts for birds, particularly in treeless regions. If the wings of a bird simultaneously contact a conductor and another object such as an adjacent conductor, support tower or tree, the resulting electrical short-circuit can kill the bird and also damage the power system. The electrical short circuit can further cause electrical system damage resulting in power outages.

Conductor cover may be installed over cables in order to protect energized cables from wildlife and other incidental contact that may cause power system faults or outages. Conductor covers such as Instant Insulation or Stinger Covers sold by Salisbury are examples of the type of cover used in the industry for this purpose. There are three basic work methods for applying conductor cover: application to a grounded (de-energized) system; application by a worker using rubber gloves to apply the conductor cover to a system that could be energized or de-energized; and application by a worker using a hot stick to apply the conductor cover to an energized or de-energized system. Using rubber gloves is awkward and difficult due to the thick resilient plastic incorporated into the rubber gloves. The hot stick method eliminates the risks to workers of working in the vicinity of energized components such as lightning arrestors and fused disconnects. Unfortunately, applying conductor cover over a cable is often difficult to accomplish, as the cover may be resilient in nature and awkward to handle. Also, the conductor is often free to move during installation and this can pose a risk to the individual applying the cover and/or to the energized system.

One type of applicator used in the industry for applying such cover on energized conductor is the 2494 applicator, also sold by Salisbury. The 2494 applicator has two rigid closely-parallel prongs attached to one another at both ends. To install the conductor cover on a cable, one end of the Instant Insulation or other conductor cover is first flattened and inserted in between the applicator prongs. The prongs are then rolled to coil the insulation around the prongs. The prongs hold the cover flat, and a user can then place the flattened cover over a cable by unrolling the cover onto the cable.

Another type of applicator is disclosed in U.S. Pat. No. 8,621,735, and may be used with a hot stick. A drive system and rollers may be used to draw conductor cover through a head onto a cable. The applicator may have a hand-grip or handle on the head.

Generally, the process of retrofitting electrical equipment with dielectric protective covers may be costly and may require powering down the system. Power down interruptions for the purpose of installing protective covers can keep a system down for a half a day or longer time periods, at great cost. Some systems are operated under the direction of a regulatory and scheduling authority that controls the system's downtime scheduling. In locations with minimal spare power transmission capacity, it can be a challenge for a system to get the downtime needed to install protective covers. Because electrical systems are usually scheduled for maintenance downtime on a fairly short notice (typically a week for non-emergency situations), and because scheduled downtime may be cancelled by the Regulatory Authority on an extremely short notice, there is no guarantee that a component protector will be installed during a system's available downtime period. As a result, a system can experience significant delays in protecting their equipment. Thus, in some cases it may not be feasible to de-energize electrical equipment in order to install covers and as a result covers may need to be installed remotely on energized equipment. In addition, remote installation may also be required on energized or non-energized equipment, including equipment that is difficult to access directly.

Tubular conductor covers, such as resilient conductor covers, may be applied to electric cables as a permanent cover to protect against outages caused by weather, trees and animals. Conductor covers typically resist ozone and ultraviolet deterioration, while remaining flexible even at low temperatures. Conductor covers may be made from resilient material, in order to stay firmly wrapped around an energized cable after application. Conductor covers are made from, for example, SALCOR elastomer, silicon rubber tubing, or other polymeric material. Conductor covers are generally dielectrics that act as a barrier to prevent the inadvertent transfer of electrical energy from the cable.

FIG. 8F illustrates one type of dielectric conductor cover 12. Cover 12 may be split longitudinally to define longitudinal edges 12A and 12B. Portions of the cover 12 adjacent the edges 12A and 12B may overlap when the cover 12 is relaxed, forming an overlapping portion 11 as shown. This type of cover 12 can typically be installed and secured to a cable 14 with zero or very little extra fastening. Another type of cover (not shown) may be split longitudinally such that first and second longitudinal edges 12A and 12B define respective flanges that provide surfaces through which fasteners may be used to secure the flanges together. In cross-section the cover 12 may have a thickness that increases gradually from edge 12A to center, and then decreases gradually from center to opposite edge 12B. Another type of cover (not shown) may be a regular tube of material sliced longitudinally and radially down the side such that first and second longitudinal edges 12A and 12B contact one another. Other cover types may be used with the applicators and methods disclosed herein, including heavy and light duty cover. Also, this document should not be limited to conductor cover brands or materials of construction presently on the market. With some types of cover, tape and/or tie wraps may be required as a fastener to secure the cover in place after application.

Figure 3:
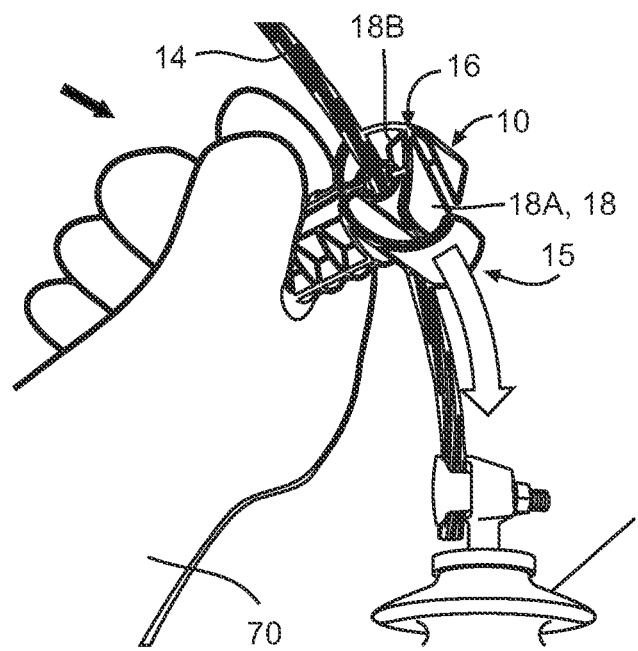

Referring to FIGS. 3 and 14-15, an applicator 10 for applying a tubular conductor cover 12, such as a resilient tubular conductor cover, to a cable 14 is illustrated. Applicator 10 comprises a separator 16. Referring to FIG. 1, the separator 16 may be located on a head 15. Separator 16 may comprise separating elements, such as jaws 18, for example first jaw 18A and second jaw 18B. Separating elements may be surfaces, of the separator 16, that may be oriented away from one another as shown to spread open the conductor cover 12 in use. Head 15 may be made out of various suitable materials, for example steel, aluminum, or carbon fiber. Head 15 may also be partly or completely constructed of dielectric materials. In one case the entirety of the applicator 10 is made of dielectric materials.

Figure 2:
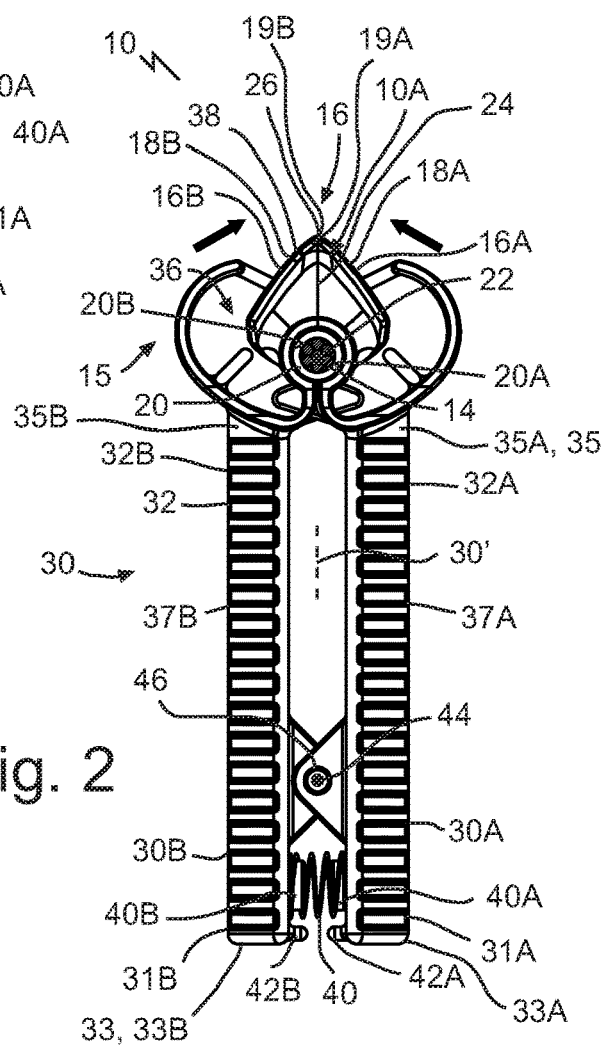

Referring to FIG. 8A, separator 16 may be shaped to open the cover 12 to permit the cover 12 to be applied over the cable 14. Separator 16, for example jaws 18A, B, may be shaped to contact an interior surface 12C of the conductor cover 12 to spread open or maintain the first longitudinal edge 12A and the second longitudinal edge 12B along a portion 13 of the conductor cover 12 to allow the portion 13 of the conductor cover 12 to be applied to a cable 14, when the applicator 10 is in operation. In some embodiments, jaws 18 may be spaced to contact interior surface 12C. In the embodiment illustrated, jaws 18 are defined by a pair of inwardly wrapped arms, for example arcuate portions, connected to head 15. A cable passage 20 may also be at least partially defined by the separator, for example between the jaws 18. Referring to FIG. 2, passage 20 may be structured for a cable 14 to, in operation, move axially through the separator 16 along a cable travel axis 22 defined by the passage 20.

Referring to FIGS. 1-2, the jaws 18A, 18B may be structured to vary a separation distance 24 between the jaws 18A, 18B to open and close a mouth 26. Mouth 26 may be defined between the jaws 18A, 18B. When the mouth is open (FIG. 1), a cable 14 may be permitted to move through mouth 26 in a radial direction 28 relative to the cable travel axis 22 to enter the passage 20. When the mouth is open the distance 24 may be greater than the diameter of the cable 14. When the mouth is closed (FIG. 2), the separation distance 24 may be reduced to zero, for example if contact surfaces 19A and 19B on jaws 18A, 18B, respectively, contact one another, or separation distance 24 may be reduced to restrict the cable 14 from entering the passage 20, for example if the distance 24 were reduced to at or below a diameter of the cable 14.

Referring to FIGS. 1-2, the separation distances 24 between jaws 18A, 18B may be varied by a suitable mechanism. In the example shown, the jaws 18A, 18B are connected to pivot relative to one another to vary the separation distance 24. The jaws 18A, 18B may open and close in a clamshell fashion to expand and contract the cross-sectional area of the passage 20. In one case the closing of the jaws 18A, 18B acts to grip the cable 14 within the passage 20. In other cases the jaws 18A, 18B may be connected to translate relative to on another (not shown), or to translate and pivot, to rotate, or undergo other suitable movements.

Referring to FIGS. 1 and 2, a handle 30 may be mounted to the separator 16. The handle 30 may form a hand grip shaft as shown, for example having a shaft axis 30', which may be oriented perpendicular to, or within forty-five degrees of perpendicular to, the cable travel axis 22 of the passage 20. The handle 30 may form a pistol grip as shown.

A pistol grip is a term used to refer to the hand grip on a firearm, where the hand grip or gripping shaft is mounted at a non-zero angle, in many cases forming an angle within forty-five degrees of perpendicular to the barrel axis. Referring to FIGS. 14 and 15, the handle 30 may be structured to improve friction between the handle 30 and the user, for example using texturing, surface treatments or coatings, ridges 37A and 37B, or other suitable mechanisms.

Referring to FIGS. 1 and 2, the handle 30 may be connected to operate the jaws 18A, 18B to vary the separation distance 24 between the jaws 18A, 18B. The handle 30 may be connected to vary the distance 24 by an actuator, such as a trigger (not shown), for example a depressible button or squeeze trigger. In the example shown, the handle 30 is formed of handle parts 30A, 30B that are connected to move relative to one another. The handle 30 may form a hand grip shaft that is split in a longitudinal direction, for example along a shaft axis 30', to define the handle parts 30A, 30B. The handle parts 30A, 30B may be each connected to a respective jaw 18A, 18B, of the jaws such that relative movement between the handle parts 30A, 30B acts to vary the separation distance between the jaws 18A, 18B. The handle parts 30A, 30B may vary the separation distance upon between squeezed together.

Referring to FIGS. 1 and 2, the handle parts 30A, 30B may be connected to pivot relative to one another. The handle parts 30A, 30B may be connected to pivot at a pivot axis 44. In the example shown the pivot axis 44 is defined by a hinge 46. Referring to FIGS. 9-12, the hinge 46 may be formed of a suitable structure, such as plurality of interlocking flanges 46A, 46B, that each define holes 48A, 48B, that align in use to form a conduit for a hinge pin 47. Other hinges may be used, including living hinges, tracked hinges, piano hinges, and others. Although the example given illustrates a single axis pivot, a multi axis movement may be used to vary the separation distance, for example a pin on one handle part 30A may travel along a curved path defined by a curved slot on the other handle part 30B. Other types of movement may be used.

Referring to FIGS. 1 and 2, the handle parts 30A, 30B may be structured to move by a squeeze action (see squeeze force vector lines 68 in FIG. 1) of the user's hand 70 (FIG. 3) upon a portion of the handle 30. In the example shown, the pivot axis 44 is located partway between a first axial end or ends 33A, 33B, and a second axial end or ends 35A, 35B, of the handle or handle parts 30A, 30B, respectively. The locating of the pivot axis 44 at an intermediate location between ends 33 and 35 effectively defines lower portions 31A, 31B, and upper portions 32A, 32B, of each handle part 30A, 30B, respectively. If a user applies a squeeze pressure to lower portions 31A, 31B, the jaws 18A, 18B will open. If the user applies a squeeze pressure to upper portions 32A, 32B, the jaws 18A, 18B will close. The jaws 18A, 18B may be biased in one direction, for example to close, for example via a suitable biasing mechanism such as a spring 40. In such a case, the user need only remove the squeeze pressure from lower portions 31A, 31B to close the jaws 18A, 18B and hence the mouth 26. Referring to FIGS. 1 and 9-12, in the example shown spring 40 mounts on opposed nubs or projections 40A, 40B. Stops, such as ridges 42A, 42B may be provided to prevent over-rotation of handle parts 30A, 30B and hence jaws 18A, 18B.

Referring to FIG. 8A, as discussed elsewhere in this document, the separator 16 may comprise plural separating elements, such as a pair of separating elements 16A, 16B. The pair of separating elements 16A, 16B may be arranged at respective angular positions about the passage 20 relative to the cable travel axis 22. In the example shown each jaw of the movable jaws 18A, 18B forms a respective separating element 16A, 16B. The separator 16 may be a single piece in other cases. In some cases separating elements 16A, 16B, or parts of same, may be connected in fixed relation to one another.

Figure 4:
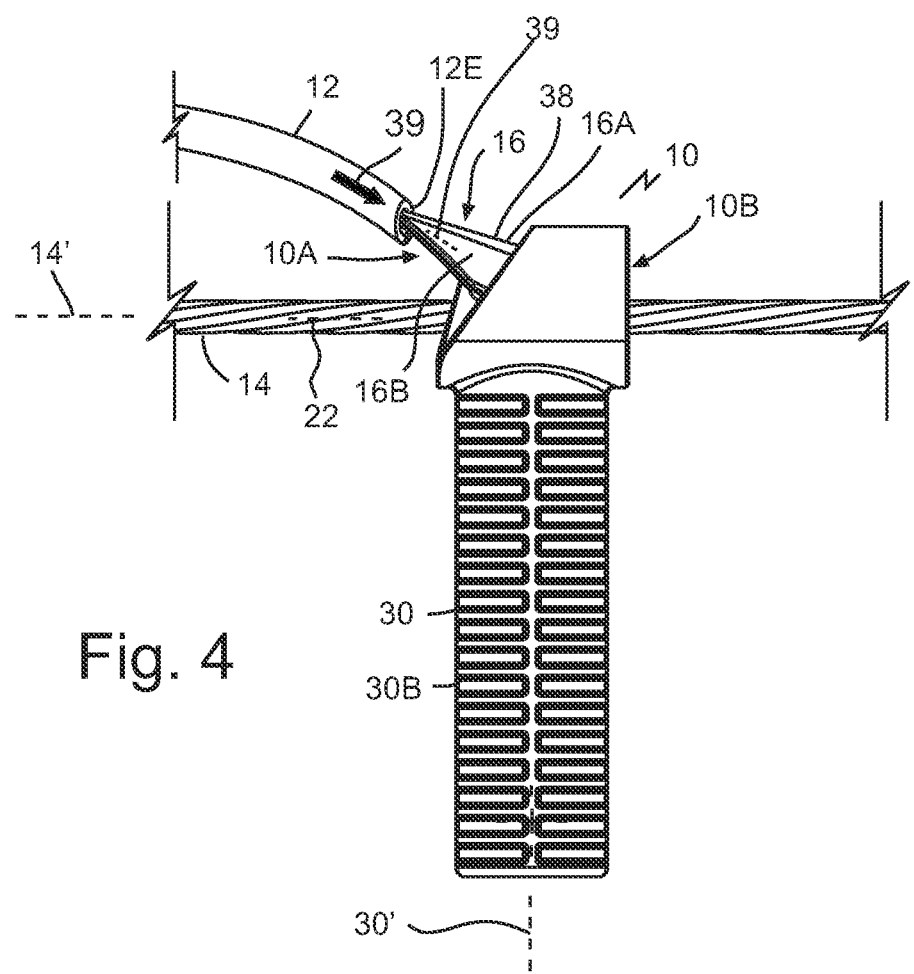
Figure 9:
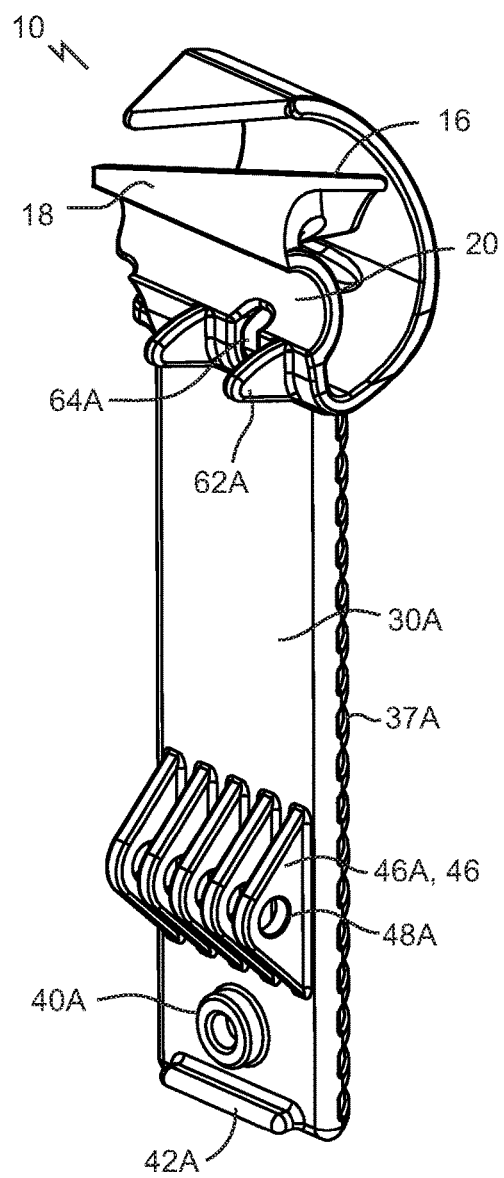
FIG. 9 is a perspective view of a right handle part and separator jaw of the conductor cover applicator of FIG. 1.

Referring to FIGS. 4, 8A, and 14-15, the pair of separating elements 16A, 16B, for example jaws 18A, 18B, may collectively form a tongue 38. Referring to FIG. 4, the tongue 38 may define a cover insertion axis 39 that forms a non-zero angle, such as an acute angle as shown, with the cable travel axis 22. Referring to FIGS. 8 and 8A, the tongue 38 may have opposed surfaces, such as side edges 38A, 38B, that face outward to contact the interior surface 12C of the dielectric conductor cover 12 in operation to spread open the first longitudinal edge 12A and the second longitudinal edge 12B. One of the opposed surfaces, in this case side edge 38A may be defined by one of the pair of separating elements, in this case element 16A, and the other of the opposed surfaces, in this case side edge 38B, may be defined by the other of the pair of separating elements, in this case element 16B.

Referring to FIG. 8, the tongue 38 may act as a wedge element to open the cover 12. The edges 38A, 38B may move together with decreasing distance toward a cover insertion end of the tongue, the cover insertion end being defined in FIG. 8 as the cover entrance end 10A of the applicator 10. The opposed surfaces, which in this case include side edges 38A, 38B, may converge at a knife point 38C defined at the cover insertion end of the tongue 38. The knife point 38C may be defined at the interface between the jaws 18A, 18B. In the example shown, the closing of the jaws 18A, 18B effectively encloses the cable 14 and forms the tongue 38, which then acts as a wedge element that wedges open the cover 12 as the cover 12 enters the applicator 10. Referring to FIG. 8A, the tongue 38 may define a cover-contacting guide surface profile 75 of a suitable shape, such as an arcuate convex shape in cross-section, with side edges 38A, 38B at the lateral periphery of the tongue 38. Instead of straight edges 38A, 38B, other shapes may be used, such as knife, flat or curved edges or surfaces, or combinations of one or more of the foregoing. The opposed surfaces when defined by side edges 38A, 38B are spaced by a local maximum separation distance to form discrete contact points that push laterally outwards to open the cover 12, however, in some cases the opposed surfaces may be formed as part of an arcuate structure that contacts the interior surface 12C of the cover 12 at intermediate points, or continuously, in between the opposed surfaces.

Referring to FIGS. 8 and 8A, in use the knife point 38C is inserted into the cover 12. As the tongue 38 is advanced into the cover, the edges 38A, 38B apply lateral force to interior surface 12C of cover, separating longitudinal edges 12A and 12B so that by the time cover 12 reaches channel 36, the edges 12A and 12B have been separated sufficiently to fit within channel 36. Edges 38A, 38B push in opposite lateral directions against interior surface 12C of cover 12 to spread cover arms 12D relative to one another. Referring to FIG. 4, initially, edges 38A, 38B push against a lead axial edge 12E of cover 12.

Referring to FIGS. 8B-D, the separator 16 may be structured to facilitate proper curling of longitudinal edges 12A, 12B around the cable 14 on exit from the applicator 10, and to prevent each of the edges 12A and 12B from curling over itself. In the section views shown the cover 12 has contacted edges 38A, 38B and then has advanced partway through the applicator 10 to the different stages shown in FIGS. 8B, 8C, and 8D.

Referring to FIGS. 8B-C, the separator 16 defines a cover-contacting guide surface profile 75 that comprises an arcuate or bulbous head profile 76 that underlies and contacts a middle portion of the interior surface 12C of the arcuate portion 13 of the cover 12. The head profile 76 may follow or correspond with the shape of the two arms, of an obtuse triangle with curved edges, that define the largest angle in the triangle. The profile 75 may extend in lateral directions to side edges 38A, 38B, and then may be undercut to define longitudinal edge-receiving concave parts, such as grooves 66A, 66B.

Referring to FIG. 8B, the grooves 66A, 66B are shaped and positioned to receive the edges 12A, 12B, respectively, and to permit the edges 12A, 12B to hook around edges 12A, 12B, which flare outward relative to the respective sides of the applicator 10. In the section shown, the edges 38A, 38B may be defined on convex parts whose average radius of curvature is less than 1/10 the radius of the cover 12 in a neutral state. In such a position the edges 12A and 12B may hook around the edges 38A, 38B to then apply a tension along the portion 13 of the cover 12, acting to pull the cover 12 toward the profile 76. In some cases the edges 12A, 12B do not hook around the side edges 38A, 38B and instead may simple contact the edges 38A, 38B. Referring to FIG. 8C, as the cover 12 advances further into the applicator 10, the grooves 66A, 66B gradually transition, with increasing distance from the cover entry end 10A (FIG. 8) of the applicator 10, into longitudinal edge-contacting convex parts 67A, 67B that are shaped to reduce curling of the first and second longitudinal edges 12A, 12B as the dielectric conductor cover 12 travels through the separator 16 in operation.

Each groove 66—side edge 38 pair may eventually transition into a respective convex part, and referring to FIG. 8D, eventually the profile 75 may become circular. The gradual and incremental transition may act to first hook the edges 12A, 12B, and then guide the edges 12A, 12B into a configuration where the edges 12A, 12B furl together one over the other upon exit from the applicator 10 to enclose the cable 14. Referring to FIG. 8D, the ends of the profile 75 may each connect to a respective concave stem part 77A, 77B, which may connect the separator 16 to the handle 30. The stem parts 77A, 77B may be shaped to impart reverse curl on edges 12A, 12B of conductor cover 12 whose circumferential interior length is longer than the circumferential length of the circular part of the profile 75. Although the word circular is used to describe the eventual shape of the profile 75, non-circular convex shapes may be used, including ovals, ellipses, and others.

Referring to FIG. 8D, the separating elements 16A, 16B, or other parts of the head 15 in cooperating with the separating elements 16A, 16B, may form a guide channel for the cover 12. The pair of separating elements 16A, 16B may collectively define a U-channel 36 contoured to fit the portion 13 of the dielectric conductor cover 12. Each separating element may define a respective arm portion 78A, 78B of the U-channel 36, with each arm portion connecting to a respective opposed side of a middle portion 80 of the U-channel 36. The middle portion 80 may be understood as forming the base of the U, although in the example shown the U-channel 36 is oriented upside-down. The U-channel 36 may be positioned such that the middle portion 80 bridges the mouth 26 defined by the jaws 18A 18B. Thus, in the example shown, when cover 12 is passing through the applicator 10, a middle portion 80 of the arcuate portion 13 of the cover 12 overlies and bridges the mouth 26. The reference to the fact that the channel 36 forms a U is not intended to limit the channel 36 to an alphabetical U-shape, and includes arcuate channels, U-channels with sharp or curved transitions between the middle portion and the arm portions, and others. Non-U-shaped channels 36 may be used, including W-shaped channels, planar channels, box-shaped channels, and others.

Referring to FIG. 8D, the channel 36 may be defined by an inner part and an outer part. The inner part may have outward-facing surfaces, such as conductor-cover-contacting external surfaces 50A, 50B, with such surfaces located to contact the interior surface 12C of the dielectric conductor cover 12 in operation to spread open the first longitudinal edge 12A and the second longitudinal edge 12B. The outer part may be spaced from the inner part to define a dielectric conductor cover-receiving channel 36. The outer part, which may include wings 52A, 52B that curl around separator 16 in spaced relationship to separator 16, may have inward-facing surfaces, such as those defined by fins 54A, 54B projecting radially inward from wings 52A, 52B. Fins 54A, 54B are located to contact an exterior surface 12F of the dielectric conductor cover 12 to press the dielectric conductor cover 12 against the surfaces 50A, 50B. Referring to FIGS. 8 and 15, fins 54A, 54B may be tapered to move closer to surfaces 50A, 50B with decreasing distance from a cover exit end 10B of applicator 10, in order to gradually guide and, if contact is made between fins 54A, 54B and cover 12, to press the cover 12 against the surfaces 50A, 50B to facilitate the transition of the cover 12 onto the cable and to facilitate proper unfurling of the edges 12A, 12B in some cases.

Referring to FIG. 8D, the pair of separating elements 16A, 16B may each form arcuate parts that contact the cover 12 and define the cable passage 20. The elements 16A, 16B may have conductor-cover-facing external surfaces 50A, 50B, as above, and cable-facing-internal surfaces, such as forming front and rear walls 21 and 23, respectively, and side walls 25A, 25B, with walls 21, 23, 25A, and 25B collectively defining the passage 20. In the example shown, both separating elements 16A, 16B collectively define front and rear walls 21 and 23, while each separating element 16A, 16B defines a respective side wall 25A, 25B. In the example shown, the front wall 21 is defined adjacent the mouth 26. When the mouth 26 is closed, the pair of separating elements 16A, 16B may collectively form a sleeve that defines the passage 20, at at least one section of the applicator 10 between ends 10A and 10B. To form a sleeve each element 16A, 16B may have a semi-circular shape as shown.

Referring to FIG. 8D, the arcuate parts formed by elements 16A, 16B may be shaped such that the conductor-cover-facing external surfaces 50A, 50B may each wrap more than ninety degrees around the passage 20, thus permitting the edges 12A, 12B of a cover 12 positioned on the surfaces 50A, 50B to wrap around from a front side 12G of a cable 14 positioned in the passage 20 to a rear side 12H of the cable 14. Referring to FIGS. 8E, 13, and 15, such a configuration positions the edges 12A, 12B close to one another such that as the cover 12 exits the applicator 10, the edges 12A and 12B are positioned to properly wrap one over the other over the cable 14. In some cases the applicator 10 is structured so the edges 12A, 12B wrap three hundred sixty degrees or more around the sleeve defined by the elements 16A, 16B, in some cases contacting or overlapping one another to being the curling action around cable 14. In the example shown the position of the stem parts 77A, 77B and the circumference of the sleeve blocks edges 12A, 12B from such action at the section delineated by section lines 8D1 in FIG. 8.

Referring to FIGS. 8E, 10, 12, 13, and 15, the conductor cover facing external surfaces 50A, 50B may be structured to facilitate proper curling of the edges 12A, 12B prior to exit of the cover 12 from the applicator 10 at cover exit end 10B. Proper curling is understood to mean that the edges 12A, 12B overlap one over the other around the cable 14, without each of edges 12A or 12B curling back over itself. In the example shown, the stem parts 77A, 77B and the surfaces 50A, 50B are indented, to form indented portions 58A, 58B, from end 10B in a direction parallel to cable travel axis 22. Also, referring to FIG. 13, the edges 60A, 60B of surfaces 50A, 50B that define the indented portions 58A, 58B are tapered with increasing separation distance moving toward exit end 10B. Thus, referring to FIGS. 8E and 13, as the cover 12 moves toward the end 10B, the edges 12A and 12B are permitted to advance towards each other and begin to overlap (see the parts shown in dashed lines in both figures) prior to the cover 12 and cable 14 being released from the applicator 10.

Figure 10:
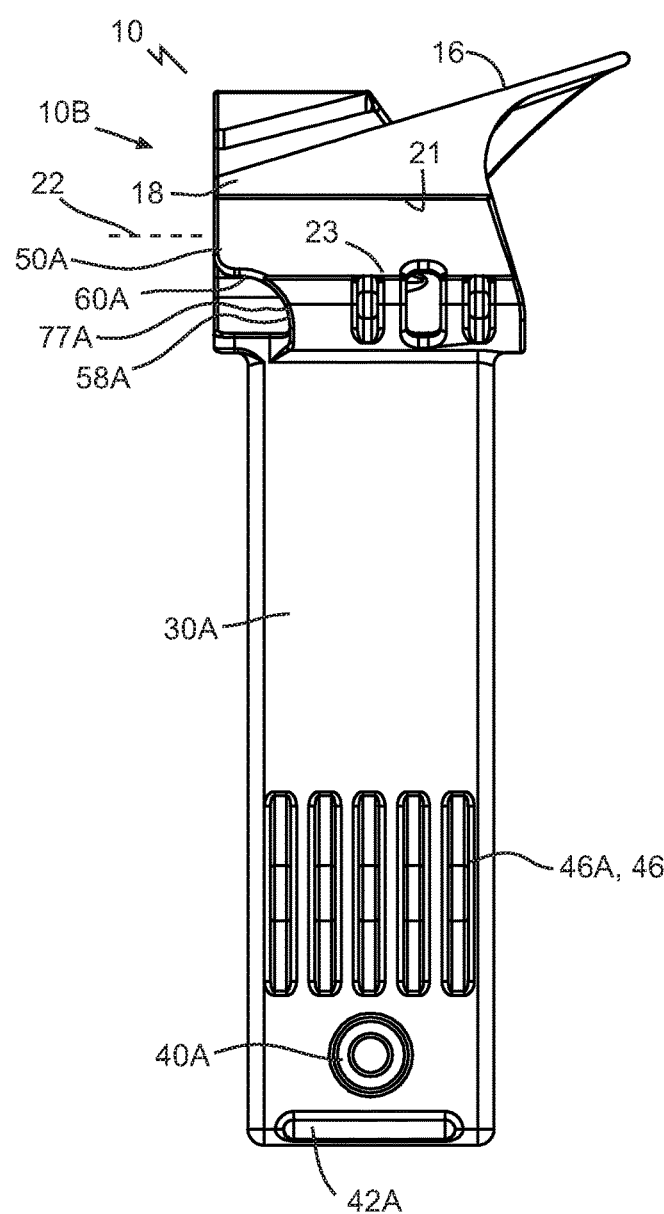
FIG. 10 is an inside side elevation view of the right handle part and separator jaw of FIG. 9.
Figure 11:
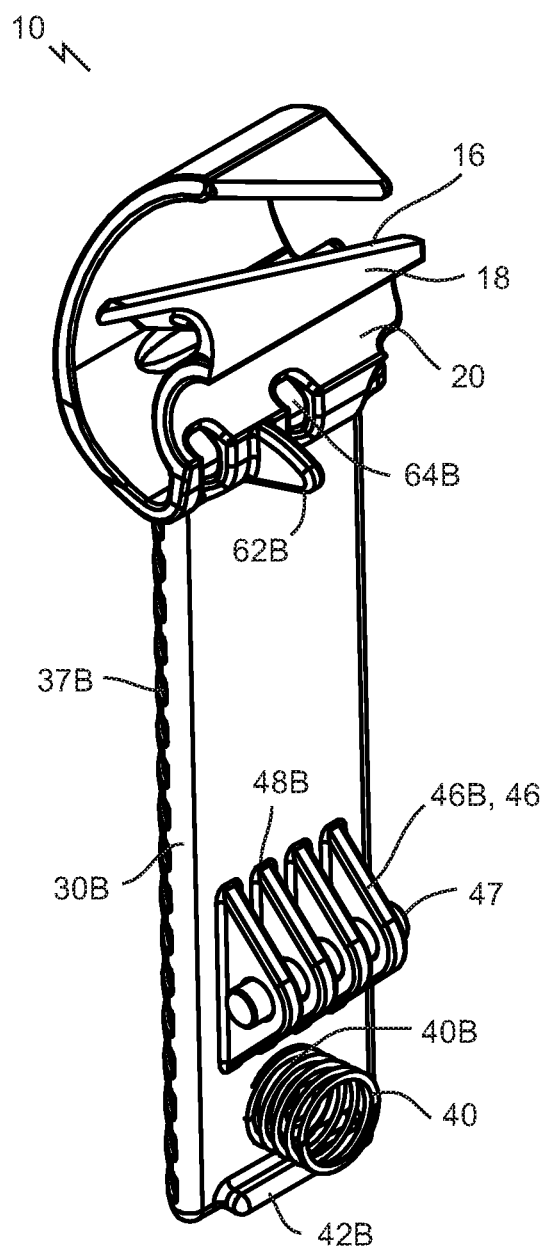
FIG. 11 is a perspective view of a left handle part, separator jaw, and spring, of the conductor cover applicator of FIG. 1.
Figure 12:
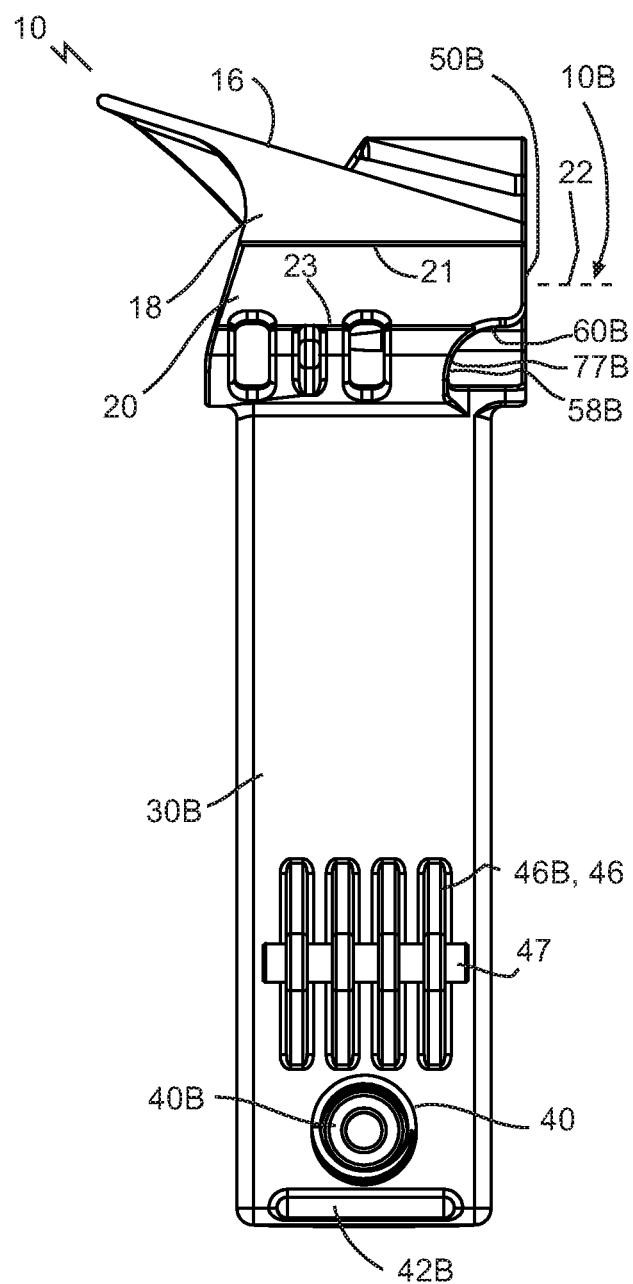
FIG. 12 is an inside side elevation view of the left handle part, separator jaw, and spring, of FIG. 11.

Referring to FIGS. 8B, 10, and 12, the jaws 18A, 18B may incorporate parts, such as male and female parts 62 and 64, that cooperate to align and enclose the passage 20 in use. In the example shown the jaws 18A, 18B have cooperating male and female parts (male parts 62A, 62B, and female parts 64A, 64B) that align to define the rear side 23 of the cross-sectional profile of the passage 20, opposite the front side or wall 21, at least when the jaws are closed. In other cases surfaces of the jaws 18A, 18B may simply approach each other and in some cases contact or abut each other to define the rear side 23 of the passage 20 in use. Male and female parts may assist in aligning the jaws 18A, 18B, for example to prevent operational forces from shifting one jaw 18A or 18B more than a nominal displacement in a direction parallel to cable travel axis 22 relative to the other jaw 18A or 18B. Referring to FIG. 1, male and female parts 62 and 64 may act as the bottom portion 20C or the limit of passage 20 when applicator 10 is in the open position. Male and female parts 62, 64 may prevent cable 16 from moving past passage 20 towards hinge 46. Parts 62 and 64 may mesh, interlock, and fit in other suitable fashions.

Referring to FIGS. 1-6, a method of installing tubular conductor cover 12 over a cable 14 is illustrated, in the context of protecting an electrical power transmission system. Referring to FIGS. 1-2, in an initial stage, the cable 14 is moved into the passage 20 of the separator 16. In the example shown, a user (not shown) would first squeeze the lower portions 31A, 31B of the handle parts 30A, 30B, compressing the spring 40 and opening the cable mouth 26 defined between the jaws 18A, 18B. Once opened, the cable 14 may be moved in a radial direction as shown through the mouth 26 into the passage 20. The jaws 18A, 18B may then be closed about the cable 14 (FIG. 2). Referring to FIG. 3, before or after the insertion of the cable 14, the applicator 10 may be positioned at a point along the cable 14 suitable for beginning application of cover 12 over the cable. In the example shown the user positions the applicator 10 adjacent a bushing 72 in order to apply cover 12 along the length of the cable 14 from the bushing 72 outward.

Referring to FIGS. 4, 5, and 8A, the first longitudinal edge 12A and the second longitudinal edge 12B of the portion 13 of the dielectric conductor cover 12 are spread open using the separator 16. The tongue 38 may contact the interior surface 12C of the cover 12, opening the cover 12 up and advancing the cover 12 into the applicator 10. Referring to FIG. 6, an initial portion of the cover 12 may be fed through the applicator 10 with a user's hand 70B, while the other hand 70A hold onto the handle 30 to oppose the force applied by the hand 70B. Referring to FIG. 8, prior to continuing the user may inspect that the cover 12 is centered within the channel 36 with edges 12A and 12B sitting over side edges 38A, 38B or otherwise properly positioned. All actions done by the user may be carried out with proper safety gear if required, such as rubber work gloves as shown.

Referring to FIGS. 5 and 6, the user then applies a length of the dielectric conductor cover 12 to the cable 14 through the separator 16. A user may do so by a suitable method such as the one shown in FIG. 6, where one hand 70B feeds cover 12 through the applicator 10 while the other hand 70A holds the handle 30. Another suitable method is by using the one hand 70B to hold a leading end 81 of the cover 12, while the other hand 70A pulls the applicator in a direction away from end 81, sliding the applicator 10 through the cover 12 and cable 14 and applying the cover 12 to the cable 14. In some cases, a fastener, such as a clip, may be used to secure end 81 to cable 14 to permit the applicator 10 to be slid down the axis of the cable 14 to apply cover 12. In some cases the friction between the cable 14 and the cover 12 of end 81 may be sufficient to permit a user to slid the applicator 10 along the cable 14 to apply cover 12 without gripping the end 81 or without otherwise using the other hand 70B to assist. In an initial application stage a user may push approximately 4-5 inches of cover through the applicator tool. The user may also verify that the cover 12 is centered within channel 36.

Referring to FIGS. 1 and 2, after applying the length of the dielectric conductor cover 12 to the cable 14, the applicator 10 may be removed from the cable 14. In the example where movable jaws 18A, B are used, the user may apply the reverse of the sequence shown from FIG. 1 to FIG. 2 to release the cable. Thus, the user may squeeze portions 31A, 31B together to compress the spring 40 and open the mouth 26, and thereafter may move the cable 14 in a radial direction opposite that of arrow 28, in order to release the cable 14.

Referring to FIG. 7, once installed on the cable 14, the user may take steps to ensure that the cover 12 is properly positioned and configured. For example a user may inspect that the edges 12A and 12B have curled and overlapped as desired. The user may also ensure that the cover 12 is fully closed around the wire or cable 14. The user may apply a twisting force to the cover 12, for example by squeezing and rotating the cover 12, to set the seam in place. The user may also translate the cover 12 axially along the cable 14 if desired, for example to move the cover 12 into abutment with the bushing 74 as shown. If the length of cover 12 applied was too long, the user may snip off the extra length of cover 12 in a suitable fashion, such as by using a knife or scissors. The conductor cover 12 may be secured to the cable 14 using fasteners (not shown), for example after a length of cover 12 is applied.

Referring to FIGS. 1-4, the methods disclosed here may include application of cover 12 to a cable 14 in a live energized electrical power transmissions system. The cable 14 itself may be energized during application. The user, or at least the user's hand, may be positioned within the Standard limits of approach. Such limits are generally set by the IEEE for live electrical systems. It should be understood that the limits of approach may vary according to region. The limits of approach around energized equipment generally widens as the voltage increases. The limits of approach correspond to increasing voltages and thus increasing radii.

When the user is positioned within a safe limit of approach, the user may be required by law to wear protective clothing.

In some embodiments a hot stick (not shown) may be used with applicator 10. A hot stick is made with a dielectric material, to prevent transmission of electricity from a working end to a user operated end of the hot stick. A hot stick allows the conductor cover 12 to be applied to an energized cable 14 by a user outside the limits of approach, despite the fact that the cable 14 is within the limits of approach. Handle 30 may be made of dielectric material, for example if the handle is a dielectric shaft. Applicator 10 may be made entirely of dielectric material. In some cases the separator and handle are made of dielectric material. In some cases, parts or all of the applicator 10 such as spring 40 are made of material than dielectric material, such as metal. For energized applications that use dielectric material, the material used is rated dielectric material that has passed an industry standard test. The applicator 10 may have a hot stick connector (not shown), for example connected to handle 32 or head 15, to allow a user to use a combination of hand and hot stick methods to apply conductor cover 12 across a long span of cable 14. The hot stick connector may include a loop or hook, for example so that a clamp stick may be used to remotely operate the applicator 10. In such cases, a user may begin the application process by hand (FIGS. 1-4), and once the application point becomes out of reach for the user, a hot stick may be connected to the hot stick connector and used to operate the applicator 10 remotely.

In some cases the applicator 10 may comprise lubricant (not shown) to reduce friction of the cover 12 through the separator 16. Suitable lubricant may be dielectric lubricant to avoid short circuits in the event the lubricant drips onto adjacent equipment. A dispenser (not shown) may be provided to dispense lubricant on the cover as the cover passes through the separator 16, or lubricant may be manually applied to the cover before application. In some cases the surfaces of applicator 10 that contact the cover 12 in use may be smooth, for example polished, to reduce friction. Surface friction may be reduced by other methods, such as pebbling.

One or more rollers may be used to reduce friction of cover through the applicator. For example, jaws 18 may comprise a roller or roller system. The roller may include a cylindrical, spherical, or other form of roller. Toothed rollers, such as gears, or wheels may be used. Low friction surfaces may be used or coated upon applicator 10 to reduce friction. The rollers or roller elements may be coated with lubricant to reduce friction. Some or all rollers may be driven, for example by gear, track, hydraulic, belt, pulley, or chain and sprocket drives, for some examples, or by other drive systems. Other drive systems may be used to draw, push, or pull the cover 12 through the applicator 10, with or without rollers. The roller surface may be configured to grip the cover, for example using texturing or contouring to minimize slippage between the conductor cover and the applicator and cover. The rollers may contact the interior surface 12C of the cover 12. The rollers may have axes perpendicular to a cable insertion axis. The rollers or jaws 18 may be biased into contact with the cover 12. The rollers may be concave or convex across a cover contact area.

The channel 36 need not be U-shaped. In some cases the channel has a W-shape. A U-shape includes a C-shape. Spacers may be used to adjust the size of the channel 36 for different sizes of conductor covers 12. The cover exit end 10B may be configured to prevent the edges 12A or 12B of cover 12 from curling in upon themselves during the application process. A universal tie stick or other type of hook (not shown) may be run longitudinally through the conductor cover 12 after application to unhook any improperly curled edges 12A or 12B to ensure proper closure. A hot stick may be used to guide the conductor cover 12 into the applicator 10. Axes discussed here may be defined by averaging points on a path. In some cases handle 30 may pivot, for example about an axis (not shown) to allow repositioning of handle 30 before or during application.

In various embodiments, there may be included any one or more of the following: The separator comprises a roller element having a roller surface for contacting and guiding the conductor cover through the separator in operation. The roller surface may comprise conductor cover gripping element. The applicator may have a biasing mechanism for biasing the roller element towards the conductor cover in use. The applicator may have an actuator lever for advancing and retracting the roller element towards and away from, respectively, the cover in use. The roller surface may be positioned for contacting an exterior surface of the conductor cover to hold the portion of the conductor cover against the separator. The roller surface may be one or more of at least partially concave or at least partially convex. The roller surface may be positioned for contacting the interior surface of the portion of conductor cover. At least one roller element may be connected for rotation to a drive system for one or both of driving and pulling the conductor cover through the separator. A drive system may be present for one or both of driving and pulling the conductor cover through the separator. The drive system may comprise a drive shaft made at least partially out of dielectric material. The separator and the separator may define a channel contoured to fit the portion of the conductor cover. The channel may be a U or W-channel. The channel may comprise one or more spacer elements. One or more spacer elements may be adjustable. The channel may be shaped to impart reverse curl on one or more of the first longitudinal edge and the second longitudinal edge at a cover exit end of the separator. The applicator may have a handle for positioning the separator. The handle may comprise a hot stick stock made at least partially of a dielectric material. The separator may be one or more of connected to, pivotally connected to, and suspended from, the handle. The separator may converge inwardly to define a wedge element for spreading the first longitudinal edge and the second longitudinal edge apart during axial movement of the conductor cover through the separator. The separator may comprise two or more separating elements spaced to contact the interior surface of the conductor cover. A cable passage may be at least partially defined by the separator. A gate may be provided, the gate having an at least partially closed position and being shaped to guide, when in the at least partially closed position, the first longitudinal edge at least partially across the cable passage and under or over the second longitudinal edge as the conductor cover exits the applicator. The gate may comprise one or more cover edge guide ridges for restricting the first longitudinal edge from curling back on itself. The gate may be biased to close or partially close in the presence of the conductor cover. The gate may comprise one or more cover edge guide ridges. One or more of the cover edge guide ridges may be angled across the cable passage with increasing distance across the cable passage towards an exit end of the gate. The gate may be a first gate and the applicator may further comprise a second gate having an at least partially closed position and being shaped to guide, when in the at least partially closed position, the second longitudinal edge at least partially across the cable passage as the conductor cover exits the applicator, in which the first gate and the second gate overlap when in the respective at least partially closed positions. A cover exit guide may be provided for in use pressing the conductor cover towards the cable upon exit from the applicator. The cover guide may comprise a roller element. The applicator may be provided in combination with a hot stick tool for maintaining control over a free portion of the conductor cover positioned upstream of the applicator in use. The cover may be provided in combination with conductor cover that is split longitudinally to have an overlapping portion defined by the first longitudinal edge and the second longitudinal edge. The separator may converge inwardly at a cover exit end of the separator for closing the first longitudinal edge and the second longitudinal edge together about the cable during axial movement of the conductor cover through the separator. Applying may comprise rolling the conductor cover through the separator using one or more roller elements. The conductor cover may be secured to the cable using fasteners. The separator may be connected to a handle that comprises a hot stick made at least partially of a dielectric material, and in which applying comprises applying the conductor cover to an energized cable by a user outside the limits of approach. Applying may comprise one or more of driving and pulling the conductor cover through the separator. Applying may comprise guiding the separator along the cable. The cover may be clamped against the separator or another part of the applicator prior to application. The applicator may comprise a handle for positioning the separator. The handle may comprise a hot stick stock made at least partially of a dielectric material. The hot stick may be for applying conductor cover to energized cable outside of the limits of approach. A roller element may be provided on the separator with a roller surface for contacting an outer surface of the conductor cover to hold the portion of the conductor cover against the separator and for guiding the conductor cover through the separator. The separator may be constructed wholly or partially of a dielectric material. The separator may comprise two or more separating elements spaced to contact the interior surface of the conductor cover. The separator may comprise a roller element having a roller surface for contacting and guiding the conductor cover through the separator in operation. The roller element may comprise one or more roller elements, the roller surface of at least one roller element being positioned for contacting an outer surface of the conductor cover to hold the portion of the conductor cover against the separator, and the roller surface of at least another roller element being positioned for contacting the interior surface of the portion of conductor cover. Rollers positioned in series along path may be connected by gear and sprocket to rotate in the same direction. A hand retainer may be used. The hand retainer comprises a base, a first side member extended from the base, and a first top member extended from the first side member over the base. The hand retainer comprises a second side member extended from the base, and a second top member extended from the second side member over the base, the second side member being spaced from the first side member to define a hand gap. The hand retainer has a first part that is C-shaped to receive a hand. The hand retainer has a second part that is C-shaped to receive the hand. The first part and the second part are opposed to one another to define a hand gap. The separator defines a path of conductor cover travel, and the hand retainer comprises a stop that prevents hand movement in a direction from a cover exit end to a cover entry end of the applicator, the direction being parallel to the path of conductor cover travel. A normal to the stop is parallel to the path of conductor cover travel. The hand retainer comprises one or more members that define an open ended hand receptacle. The separator defines a U-channel contoured to fit the portion of the conductor cover, and the separator comprises a middle part and two arm parts that extend from the middle part, the middle part defining at least part of a base of the U-channel and the two arm parts defining at least part of respective arms of the U-channel, the hand retainer being connected to or forming part of the middle part. The separator comprises longitudinal ridges for contacting the conductor cover. The hand retainer comprises one or more members that define an open ended hand receptacle, and in which positioning a hand in the hand retainer further comprises inserting the hand into the open ended hand receptacle.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The invention claimed is:

1. An applicator for applying a dielectric conductor cover to a cable, the dielectric conductor cover being tubular and split longitudinally to define a first longitudinal edge and a second longitudinal edge, the applicator comprising:
   a separator having jaws and defining a passage for a cable to, in operation, move axially through the separator along a cable travel axis defined by the passage;
   the jaws having outward-facing external surfaces shaped to contact, in operation of the applicator, an interior surface of the dielectric conductor cover to spread open the first longitudinal edge and the second longitudinal edge along a portion of the dielectric conductor cover to allow the portion of the dielectric conductor cover to be applied to a cable positioned in operation within the passage, and the jaws having inward-facing internal surfaces shaped to contact, in operation of the applicator, an exterior surface of the dielectric conductor cover, the outward-facing external surfaces and the inward-facing internal surfaces being spaced from one another to define a dielectric conductor cover-receiving channel therebetween;
   the jaws being structured to vary a separation distance between the jaws to open and close a mouth, defined between the jaws, through which the cable is permitted to move in a radial direction relative to the cable travel axis to enter the passage and to move the outward-facing external surfaces with respect to the inward-facing internal surfaces to vary the spread between the first longitudinal edge and the second longitudinal edge of the dielectric conductor cover.

2. The applicator of claim 1 further comprising a handle mounted to the separator and connected to operate the jaws to vary the separation distance between the jaws.

3. The applicator of claim 2 in which the handle is formed of handle parts that:
   are connected to move relative to one another; and
   are each connected to a respective jaw of the jaws such that relative movement between the handle parts acts to vary the separation distance between the jaws.

4. The applicator of claim 3 in which the handle parts vary the separation distance upon between squeezed together.

5. The applicator of claim 3 in which the handle forms a hand grip shaft that is split in a longitudinal direction to define the handle parts.

6. The applicator of claim 5 in which an axis of the hand grip shaft is perpendicular to, or within forty-five degrees of perpendicular to, the cable travel axis of the passage.

7. The applicator of claim 3 in which the handle parts are connected to pivot relative to one another.

8. The applicator of claim 7 in which the handle parts are connected to pivot at a pivot axis located in between a first axial end and a second axial end of the handle.

9. The applicator of claim 2 in which the handle is a pistol grip handle.

10. The applicator of claim 2 in which the handle comprises a hand grip shaft that is extended from the separator at a non-zero angle relative to the cable travel axis.

11. The applicator of claim 1 in which the jaws are connected to pivot relative to one another to vary the separation distance.

12. The applicator of claim 1 in which the jaws open and close in a clamshell fashion to expand and contract the cross-sectional area of the passage.

13. The applicator of claim 1 in which the jaws are biased to close the mouth.

14. The applicator of claim 1 in which each jaw of the jaws forms a respective separating element of a pair of separating elements.

15. The applicator of claim 14 in which the pair of separating elements have the outward-facing external surfaces and the inward-facing internal surfaces and collectively define the dielectric conductor cover-receiving channel therebetween as a U-channel contoured to fit the portion of the dielectric conductor cover, with the U-channel having a middle portion and two arm portions that extend from respective sides of the middle portion, with the middle portion bridging the mouth defined by the jaws.

16. The applicator of claim 15 in which the pair of separating elements each form arcuate parts with the outward-facing external surfaces and the inward-facing internal surfaces, with the arcuate parts being shaped such that the outward-facing external surfaces each wrap more than ninety degrees around the passage.

17. The applicator of claim 16 in which, when the mouth is closed, the pair of separating elements collectively form a sleeve that defines the passage.

18. The applicator of claim 14 in which:
the pair of separating elements collectively form a tongue, that has the outward-facing external surfaces that contact the interior surface of the dielectric conductor cover in operation to spread open the first longitudinal edge and the second longitudinal edge;
one of the outward-facing external surfaces is defined by one of the pair of separating elements, and the other of the outward-facing external surfaces is defined by the other of the pair of separating elements; and
the outward-facing external surfaces move together with decreasing distance toward a cover insertion end of the tongue.

19. The applicator of claim 18 in which the outward-facing external surfaces converge at a knife point defined at the cover insertion end of the tongue.

20. The applicator of claim 18 in which the pair of separating elements each define a longitudinal edge-receiving concave part, and an outer conductor cover contacting guide surface cross-sectional profile of the separator gradually transitions from the longitudinal edge-receiving concave parts, with increasing distance from a cover entry end of the applicator, into a convex shape to reduce curling of a respective one of the first and second longitudinal edges as the dielectric conductor cover travels through the separator in operation.

21. The applicator of claim 1 in which:
the mouth defines a front side of a cross-sectional profile of the passage; and
the jaws have cooperating male and female parts that align to define a rear side of the cross-sectional profile of the passage, opposite the front side, at least when the jaws are closed.

22. The applicator of claim 1 made entirely of dielectric material.

23. An applicator for applying a dielectric conductor cover to a cable, the dielectric conductor cover being tubular and split longitudinally to define a first longitudinal edge and a second longitudinal edge, the applicator comprising:
a separator having jaws and defining a passage for a cable to, in operation, move axially through the separator along a cable travel axis defined by the passage;
the jaws being shaped to contact, in operation of the applicator, an interior surface of the dielectric conductor cover to spread open the first longitudinal edge and the second longitudinal edge along a portion of the dielectric conductor cover to allow the portion of the dielectric conductor cover to be applied to a cable positioned in operation within the passage,
the jaws being structured to vary a separation distance between the jaws to open and close a mouth, defined between the jaws, through which the cable is permitted to move in a radial direction relative to the cable travel axis to enter the passage, wherein each jaw has:
an inner part whose outward-facing surfaces are located to contact the interior surface of the dielectric conductor cover in operation to spread open the first longitudinal edge and the second longitudinal edge; and
an outer part, which is spaced from the inner part to define a dielectric conductor cover-receiving channel, and whose inward-facing surfaces are located to contact an exterior surface of the dielectric conductor cover to press the dielectric conductor cover against the inner part.

24. A method of applying a dielectric conductor cover to a cable, the dielectric conductor cover being tubular and split longitudinally to define a first longitudinal edge and a second longitudinal edge, the method comprising:
opening jaws of a separator to open a mouth to a passage defined by the separator;
moving a cable in a radial direction through the mouth;
closing the jaws about the cable in the passage to close the mouth;
spreading open and closing the first longitudinal edge and the second longitudinal edge of a portion of the dielectric conductor cover with the separator, the separator having a first portion contacting an interior surface of the dielectric conductor cover and a second portion contacting an exterior surface of the dielectric conductor cover; and
moving the separator in a longitudinal direction to apply a length of the dielectric conductor cover to the cable through the separator.

25. The method of claim 24 further comprising, after applying the length of the dielectric conductor cover to the cable, opening the jaws to open the mouth and moving the cable in the radial direction through the mouth to release the cable from the passage.

26. An applicator for applying a dielectric conductor cover to a cable, the dielectric conductor cover being tubular and split longitudinally to define a first longitudinal edge and a second longitudinal edge, the applicator comprising:
- a separator that defines a passage for a cable to, in operation, move axially through the separator along a cable travel axis defined by the passage;
- the separator having a pair of separating elements arranged at respective angular positions about the passage relative to the cable travel axis;
- the pair of separating elements, in at least one configuration, being spaced to define a mouth through which the cable is permitted to move in a radial direction relative to the cable travel axis to enter the passage; and
- the pair of separating elements having outward-facing external surfaces and inward-facing internal surfaces being spaced from one another to define a dielectric conductor cover-receiving channel therebetween,
- wherein the outward-facing external surfaces contact, in operation of the applicator, an interior surface of an arcuate portion of the dielectric conductor cover, the arcuate portion being defined perpendicular to a conductor cover axis, to spread open the first longitudinal edge and the second longitudinal edge along the arcuate portion, with the arcuate portion bridging the mouth, to allow the dielectric conductor cover to be applied to a cable positioned in operation within the passage, and
- wherein the inward-facing internal surfaces contact, in operation of the applicator, an exterior surface of the dielectric conductor cover to vary the spread between the first longitudinal edge and the second longitudinal edge of the dielectric conductor cover.

* * * * *